United States Patent [19]

Nobile

[11] 4,006,451
[45] Feb. 1, 1977

[54] MODULAR ALARM CIRCUIT

[76] Inventor: Humberto Nobile, 5875 Castle Lake, San Antonio, Tex. 78218

[22] Filed: Oct. 3, 1974

[21] Appl. No.: 511,527

[52] U.S. Cl. .......................... 340/63; 307/10 AT; 340/274 R
[51] Int. Cl.² .................. B60R 25/10; G08B 13/08
[58] Field of Search ............. 340/63, 64, 274, 276; 307/10 AT; 180/114; 337/102

[56] References Cited

UNITED STATES PATENTS

| | | | |
|---|---|---|---|
| 2,892,181 | 6/1959 | Benson et al. | 340/64 |
| 2,935,730 | 5/1960 | Procter | 340/63 |
| 3,281,785 | 10/1966 | Oursler | 340/63 |
| 3,329,935 | 7/1967 | Wiggins | 340/65 |
| 3,422,398 | 1/1969 | Rubin | 340/63 |
| 3,582,853 | 6/1971 | Morris | 337/102 |
| 3,686,668 | 8/1972 | Durkee | 340/420 |
| 3,858,175 | 12/1974 | Kopera, Jr. | 340/63 |
| 3,863,212 | 1/1975 | Kyo | 340/64 |

*Primary Examiner*—John W. Caldwell
*Assistant Examiner*—Joseph E. Nowicki
*Attorney, Agent, or Firm*—Lowe, King, Price & Markva

[57] ABSTRACT

An alarm circuit module for automobile, home or industry comprises a time delay device, such as a thermostatic relay, having a set of thermally responsive contacts and an electrical heating element. When energized, the heating element causes the contacts to close for connecting an alarm to a source of power, such as a battery. The heating element is energized by the battery through sensor switches in doors, windows, etc., responsive to unauthorized entry. When the alarm is readied with a lockable switch, and a door responsive sensor switch is closed by an unauthorized entry, energization of the heating element causes the thermally responsive contacts to close. And when the switch is subsequently opened, residual heat contained in the set of thermally responsive contacts causes the alarm to remain energized for a preset period of time. When the contacts cool, the alarm is automatically deenergized to save the battery. The alarm circuit module contains a minimum number of components and is easily installed to operate with the battery and horn standardly supplied in an automobile by connecting four wires from the module to readily accessible wires under the dashboard. The alarm circuit is tested from the dashboard with a test switch and lamp incorporated with the module. The test switch also functions as a panic button manually operable during an emergency to energize the automobile horn for the preset time period.

5 Claims, 3 Drawing Figures

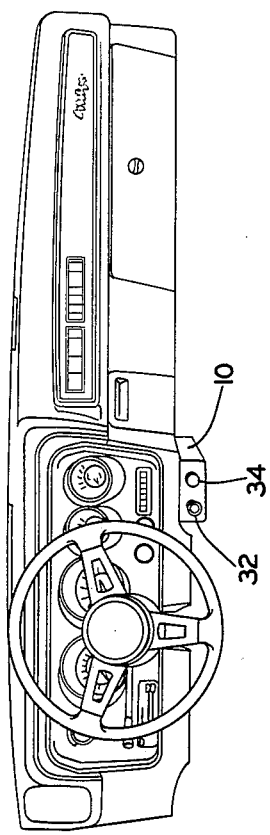
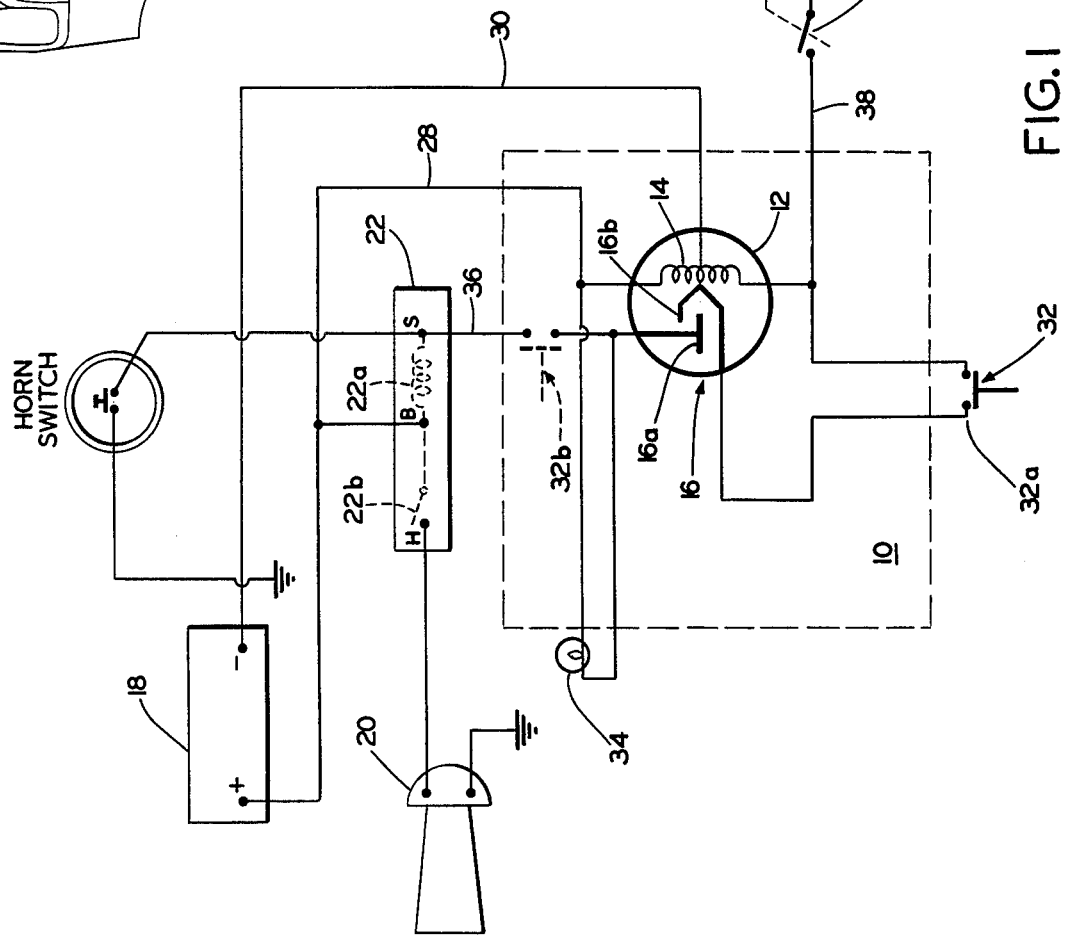

MODULAR ALARM CIRCUIT

FIELD OF THE INVENTION

The present invention relates generally to unauthorized entry alarms and particularly to an unauthorized entry alarm that latches on for a preset period of time after being activated.

DESCRIPTION OF THE PRIOR ART

The rising crime rate in recent decades, especially in urban areas, has necessitated the provision of unauthorized entry alarms in homes and in automobiles. Typically, an alarm which provides at least one of audible, visible or radio wave signalling is connected to an electrical power source through sensor switches that are responsive to any unauthorized entry.

In the automobile, the standardly equipped horn is energized by the automotive battery by means of sensor switches incorporated in such places as doors, trunk and hood. Frequently, when an unathorized entry into an automobile equipped with an alarm circuit of the prior art is attempted, the automobile horn is sounded, causing the would-be burglar to retreat without further disturbing the automobile or its contents. However, once energized, the alarm circuit is latched on and continues to apply electrical current to the horn until disabled by means of a key operated switch mounted to the exterior of the car. This arrangement causes the battery to become run down and the car cannot be started by the owner. Accordingly, although the car has not been entered, the owner of the car is often stranded with a dead battery, a situation that is inconvenient and sometimes dangerous. In order to overcome this disadvantage, some prior attempts have been made to incorporate a time delay device in the alarm circuit to automatically terminate the energization of the horn after a predetermined period of time so that the battery is not completely run down and the automobile can be started by the owner when he returns. Although often satisfactory, such alarm systems known to me are difficult to install, requiring the services of a skilled mechanic. Frequently, the cost of services of the mechanic is in excess of the cost of the automotive alarm itself.

In prior art alarms used in automobiles, it is not readily ascertainable whether the alarm is properly functioning. Typically, to test the alarm, the owner of the vehicle has to exit the car, ready the alarm by means of the externally mounted switch, and then manually activate the alarm by, for example, opening a door. This procedure is inconvenient and requires the driver to leave the vehicle; the alarm cannot be routinely tested from the dashboard while the vehicle is being driven.

It is desirable, in addition to providing an alarm responsive to unauthorized entry of the vehicle, to include a means of manually energizing the alarm from the dashboard of the car whereby the horn sounds continuously for a predetermined period of time providing "hands free" emergency operation. Hands-free operation is especially desirable for signalling distress during emergency situations when it is impossible to manually maintain the horn energized from the steering wheel mounted switch.

In the home or institution, unauthorized entry alarms typically utilize a large electrically powered horn or other DC alarm device which, through unauthorized entry responsive switches, is energized by the commerical AC power line and an AC-DC converter. These systems are often backed up with an auxiliary battery power source so that in the event of failure of the AC power line, the auxiliary battery power source provides electric power to the alarm.

These horns or other audio sources, which are sufficiently large for the home or industrial environment, such as factory or warehouse, require a substantial amount of power. For example, it is typical for horns to require up to 50 amperes of current at 12 volts during operation. Generally, once energized, industrial and home alarm systems remain energized until either manually turned off or, where battery sources are used, until the battery runs down. When the battery has run down, the home or institution is vulnerable to unauthorized entry, the alarm being nonfunctional until the battery is recharged or replaced. Further, the continuous draw of the horn current prior to wear-down of the battery produces substantial heating in the wires connecting the battery and alarm horn. Where the horn is exposed to a dusty area such as the attic of a home or storage areas of a warehouse, the accumulation of low resistance dust and other matter between the terminals of the horn causes increased current draw from the battery and the combined magnitude of the horn current and current flow caused by dust or other matter between the horn terminals sometimes produces excessive heating and a possibility of fire.

OBJECTIVES OF THE INVENTION

Accordingly, it is one object of the present invention to provide a new and improved unauthorized entry alarm.

It is another object of the present invention to provide a new and improved unauthorized entry alarm of the type that automatically turns off a predetermined period of time after it is activated.

It is yet another object of the present invention to provide an improved unauthorized entry alarm that is manually readied for operation by means of a key operated switch.

It is still another object of the present invention to provide an economical unauthorized entry alarm for an automobile that is easily installed in the dashboard.

It is yet another object of the present invention to provide an unauthorized entry alarm for an automobile that is tested by the owner from the dashboard.

It is another object of the present invention to provide a vehicle alarm system activated automatically by unauthorized entry and manually by driver or passenger from the dashboard.

It is a further object of the present invention to provide a home or industrial unauthorized entry alarm that is powered by the AC power line and an emergency back-up battery source, and automatically turns off a predetermined period of time after it is activated.

BRIEF DESCRIPTION OF THE INVENTION

The unauthorized entry alarm of the present invention comprises a thermostatic relay having an electrical heating element and a set of thermally responsive contacts. In an automobile, the heating element is connected in series with the automotive battery and a set of sensor switches that are responsive to protected portions of the automobile such as windows, trunk and hood. Also in series with the battery is a key operated switch mounted to the exterior of the car permitting the owner to ready the alarm when he leaves the automobile. When the alarm is readied by closing the exteriorly mounted key operated switch, the closing of any of the sensor switches, such as a door switch, indicative of an unauthorized door opening, causes the heating element in the thermostatic relay to be electrically energized by the battery. The heat produced by the heating element causes a set of thermally responsive contacts to close and thereby energize the horn. After being actuated, the thermally responsive contacts remain heated for a period of time due to the relatively large thermal capacity thereof and the horn continues to be energized for a period of time after the door is closed. After cool-down of the thermally responsive contacts, the contacts open to automatically turn off the horn and preserve the battery.

The simplicity of the circuit permits installation of the alarm with only four wires which are connectable to wires within the dashboard of the automobile. The alarm circuit is modular in construction and preferably sealed off from the environment. A test push-button is provided between the battery and heating element to supply battery current to the heating element for testing the thermostatic relay, battery and horn. The test push-button also functions as a panic alarm permitting an individual to manually activate the alarm from the dashboard during an emergency.

In the home or industrial environment, the alarm of the present invention is provided in combination with an AC-DC converter and an emergency battery back-up supply. The thermostatic relay is connected to unauthorized entry responsive switches, electrical power source and alarm. The alarm circuit terminates the energization of the horn during operation with either the AC power line or the back-up battery after a period of time determined by the thermal time constant of the thermally responsive set of contacts to prevent heating of the electrical wires and horn unit.

The above and still further objects, features and advantages of the present invention will become apparent upon consideration of the following details description of several specific embodiments thereof, especially when taken in conjunction with the accompanying drawing.

BRIEF DESCRIPTION OF THE DRAWING

FIG. 1 is a circuit diagram of the alarm circuit module of the present invention wired into the electrical system of an automobile;

FIG. 2 is a perspective view of the alarm circuit module installed in the dashboard of an automobile.

DETAILED DESCRIPTION OF THE DRAWING

Figure 3:
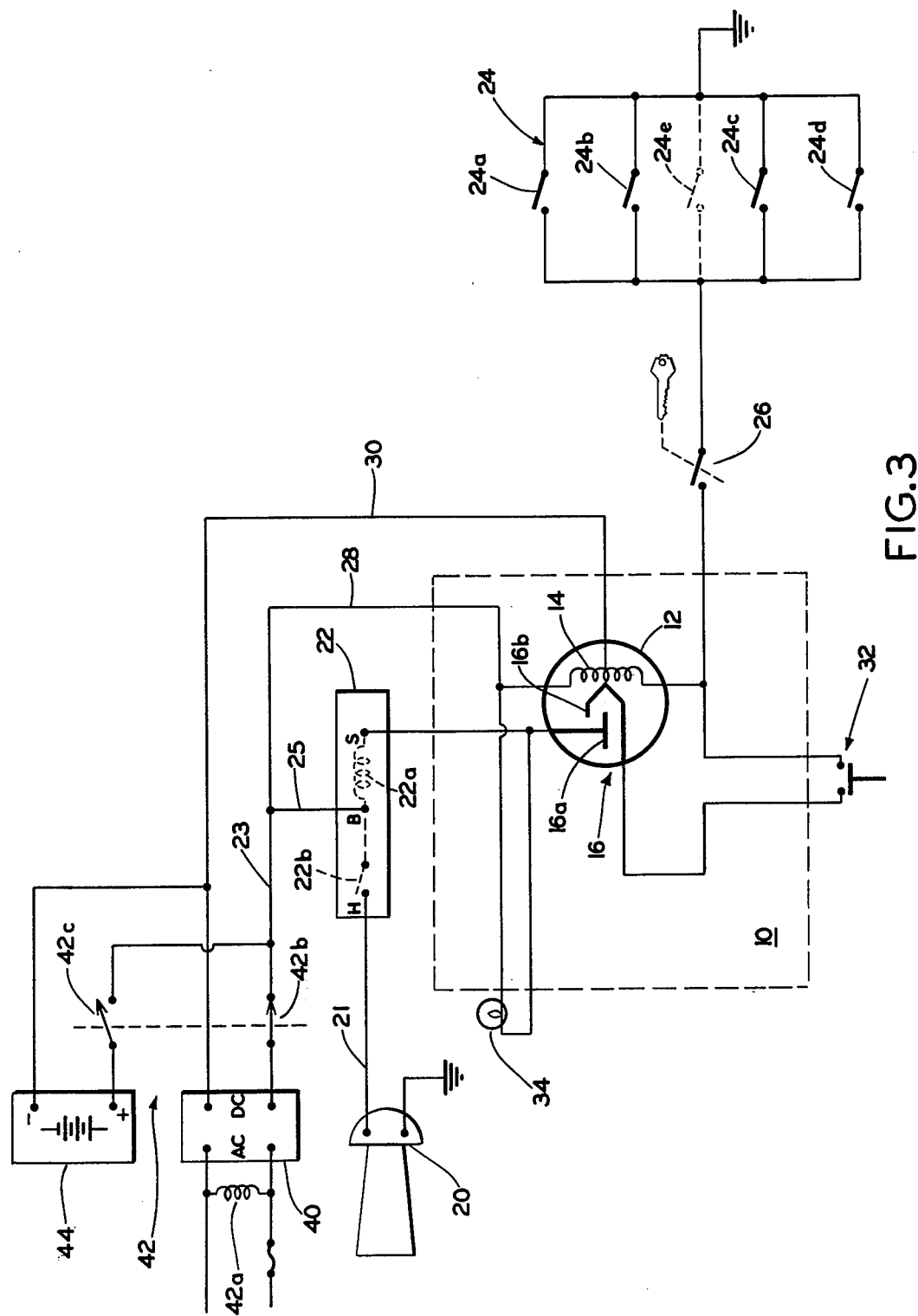
FIG. 3 is a circuit diagram of the module of the present invention applied to a home or industrial facility powered by a commercial AC power source and an emergency battery back-up power source.

Referring to FIG. 1, an automatic alarm module 10 according to the present invention is wired into the electrical system of a vehicle such as an automobile. Module 10 contains an encased thermostatic relay 12 having an electrical heating element 14 and a set of normally open, thermally responsive contacts 16. The set of contacts 16 comprises a stationary contact 16a and a thermally responive contact 16b. Thermally responsive contact 16b may be a bimetal strip which, when heated, bends sufficiently to come into electrical contact with stationary contact 16a. Heating element 14 is a length of resistance wire such as nichrome, for example, and in practice is wound directly around contact 16b. Heating element 14 and contact 16b form a set having relatively high thermal retention that is sealed off from the environment by the casing of relay 12 to prevent heat loss. Once heated by passing a current through element 14, contact 16b retains heat for a period of time after current flow is removed from heating element 14 and the set of contacts 16 remains closed for a delay period. In practice, when rated current is passed through heating element 14, the thermally responsive set of contacts 16 closes within approximately 3 seconds and remains closed from between 20 seconds and 1 minute after the flow of current is removed from the heating element.

Storage battery 18, horn 20 and horn relay 22 are standard equipment in the modern automobile. Horn relay 22 includes three externally accessible terminals H, B and S. Internally contained in horn relay 22 between terminals B and S is a relay actuating terminal coil 22a and between terminals H and B is a set of normally opened contacts 22b. Coil 22a, when energized, causes the set of contacts 22b to close by means of the magnetic field produced by the coil. In the circuit of FIG. 1, the positive terminal of battery 18 is connected to terminal B of horn relay 22 and horn 20 is connected between relay terminal H and ground of the automobile. The negative terminal of battery 18 is grounded in FIG. 1 for a vehicle having a negative ground system; however, it is to be understood that the alarm of the present invention is also operable with a positive ground system.

Horn 20 is energized by connecting terminal S of relay 22 to ground. Battery current flowing through coil 22a causes horn 20 to be connected to the positive terminal of battery 18 through contacts 22b. Contacts 16 of thermostatic relay 12 are connected between terminal S of horn relay 22 and ground and it is the closing of contacts 16 of the thermostatic relay, responsive to switches 24 and 26, that causes horn 20 to be energized.

Switches 24 are incorporated in the front and rear doors of the automobile and function to energize a dome light (not shown) when any of the doors are opened. Switches 24a, 24b, 24c and 24d respectively correspond to the left and right front doors and left and right rear doors. Switch 24e may be added in parallel to switches 24 and could be associated with the trunk, hood or gas cap, for example, of the automobile.

Switch 26 is a key operated switch that is externally mounted to the chassis of the vehicle at a location convenient to the owner, such as over a fender. When alarm 10 is to be "readied" for operation, switch 26 is manually closed thereby completing an electrical circuit comprising the positive terminal of battery 18, wire 28, heating element 14, switch 26, switches 24 and ground. In this readied condition, heating element 14 is energized by battery 18 when any of sensor switches 24a–24e is closed, due to an unauthorized entry of the protected vehicle. The closing of any of the sensor switches 24a–24e causes battery current to flow through and heat the heating element 14 of thermostatic relay 12. Since the heating element 14 is wound around thermally responsive contact 16b of the thermostatic relay, heat is transferred to the contact. When contact 16b is sufficiently heated to close against static contact 16a, a second electrical circuit is completed between ground and terminal S of relay 22 through wire 30, static contact 16a, heat responsive contact 16b and wire 36. The grounding of terminal S energizes coil 22a and closes switch 22b of the horn relay 22 to supply battery current to horn 20.

Once closed, the heat retained by thermally responsive contact 16b causes the set of contacts to remain closed for a period of time until heat has dissipated from contact 16b. Accordingly, even if one of the switches 24a–24e, after having been closed is subsequently opened, horn 20 remains energized for a delay period.

In operation, should a door, trunk or hood be opened after the alarm is readied by key operated switch 26, horn 20 will sound within approximately 2 or 3 seconds. Should the door, trunk or hood be then closed, the horn is not immediately deenergized but remains energized for at least from 20 seconds to 1 minute. Then horn 20 automatically turns off when thermally responsive contact 16b has cooled down sufficiently to break contact with static contact 16a. Even if an attempt to enter the automobile is made by an unauthorized individual who, surprised by the sounding of the horn, immediately closes the horn, the horn continues to sound. This continuing sounding of the horn ensures that he does not re-enter the automobile, yet after a limited period of time, the horn automatically turns off to prevent run-down of the battery.

Forming one important aspect of the present invention, the alarm circuit can be tested by manually closing an auxiliary test switch 32 that may be a momentary push-button type switch having a set of contacts 32a connected between static contact 16a and one end of heating element 14. When test switch 32 is manually closed, a current path is completed between ground, wire 30, static contact 16a, switch contact 32a, heating element 14, wire 28, and the positive terminal of battery 18. Heating element 14 is energized and thermostatic relay contacts 16 close to energize alarm 20. A test lamp 34 is connected between the positive terminal of battery 18 responsive contact 16a so that when the set of contacts 16 is closed, lamp 34 is energized by battery 18.

What is provided is a simple and convenient means for the owner of the automobile to test the alarm system from the dashboard of the automobile. If desired, horn 20 can be disabled during the test by including a switch 32b shown in phantom between contact 16a and horn relay 22 so that the horn does not sound during the test. When testing the operation of module 10, push-button 32 is manually depressed and held down for approximately 2 or 3 seconds to allow thermally responsive contact 16b to heat up and close against contact 16a. The owner evaluates the result of the test by viewing test lamp 34 which is energized for a period of time ranging from between twenty seconds and one minute after push-button 32 is depressed.

Push-button switch 32 also functions as a panic button to provide hands-free actuation of horn 20 during an emergency situation. In this mode, switch 32b is maintained closed. The module 10 is mounted to the dashboard at a location convenient to the driver as shown in FIG. 2 with push-button switch 32 within easy reach. Module 10 may alternatively be mounted behind the dashboard with lamp 34 and switch 32 accessible through apertures provided in the dashboard. Should any emergency situation arise wherein the driver wishes to activate the alarm without leaving the car to close key operated switch 26 mounted to the exterior of the automobile and manually operating one of sensor switches 24a–24e, the driver need only depress push-button switch 32. Contact 32a overrides switches 24 and 26 and supplies battery current directly to heating element 14 of thermostatic relay 12. Switch 32 must be held down until the set of thermostatic relay contacts 16 closes; thereafter the set of contacts remains closed for a period of time of approximately 1 minute.

Another important aspect of the present invention is that the alarm circuit described is provided in a single modular package and uses the built-in components of the automobile to form a complete automobile alarm system. Module 10 is compact and is preferably hermetically sealed for protection from the environment. The module 10 is extremely easy to install in an automobile and requires only four connections to the electical wiring harness of the automobile located inside the dashboard. During installation, wire 36 of module 10 is connected directly to terminal S of horn relay 22, wire 28 is connected to the positive voltage line of battery 18, wire 30 is connected to ground and wire 38 is connected to the automobile dome circuit which includes switches 24. Key operated switch 26, mounted to the exterior of the automobile, is connected between the ungrounded end of switches 24 and module wire 38. Since only four electrical connections are required to incorporate module 10 into the electrical system of any automobile and the connections are all made in the dashboard of the automobile, a layman can easily install module 10 and the services of a skilled mechanic are not required as with alarm systems of the prior art of which I am aware.

Referring now to FIG. 3, alarm module 10 is adapted for use in a home or industrial environment. Sensor switches 24 are placed at selected points in the home or industrial institution, such as at windows and doors, and closed in response to unauthorized opening of the same. Key operated switch 26 readies the alarm module 10 to be responsive to switches 24. Switch 26 is located at an area convenient to the homeowner or institution supervisor but not within view of others.

The alarm system is normally energized by AC-DC converter 40 that is connected to the AC power line and converts commercially supplied AC voltage to DC voltage to operate the alarm system. A line relay 42 includes a coil 42a connected across the AC power line, a normally open contact 42b connected between the positive terminal of AC-DC converter 40 and the alarm system 10 and a normally closed contact 42c connected between the positive terminal of battery 44 and the alarm system 10. When AC voltage is available from the commercial power source, the magnetic field produced by coil 42a maintains contact 42b closed and contact 42c open. Accordingly, during normal operation from the commercial AC power line, DC voltage from converter 40 is supplied to alarm system 10 and battery 44 is disconnected from the same. In the event that AC power is interrupted, coil 42a is deenergized and relay contacts 42b and 42c are switched from the positions shown in FIG. 3, i.e., contacts 42b are open and contacts 42c are closed, whereby DC voltage power is supplied to alarm system 10 from battery 44 and no interruption in operation of the alarm occurs.

When alarm system 10 operates from either battery 44 or AC-to-DC converter 40, the alarm, once activated, remains energized due to the residual heat contained in thermally responsive contract 16b transferred thereto by heating element 14. After a period of time, e.g., twenty seconds to one minute, the alarm circuit including horn 20 is automatically deenergized by the opening of set of contacts 16. If the alarm circuit is operating from battery 44, the automatic opening of contacts 16 saves the battery from becoming run down. Even if the alarm is operating from converter 40, automatic termination of the alarm prevents excessive heating of the horn 20 and wires 21, 23 and 25, and avoids the possibility of creating a fire.

In summary, a modular alarm circuit is provided that utilizes the residual heat contained in a thermally responsive contact of a thermostatic relay to maintain a door or other alarm device energized for a period of time after the alarm circuit is activated and then automatically turned off to prevent overheating of the alarm device and wiring and run down of the battery. A test circuit is provided that permits the alarm circuit and alarm device to be conveniently tested from the dashboard of an automobile and the test circuit also functions as a hands-free emergency alarm that is manually activated from the dashboard.

The modular alarm circuit can also be applied to home or industry, powered either by battery or converted commercial AC power. Where commercial AC power is used, a back-up battery and relay switching means are provided for energizing the alarm circuit upon failure of commercial power.

While there has been described and illustrated several specific embodiments of the invention, it will be clear that variations in the details of the embodiments specifically illustrated and described may be made without departing from the true spirit and scope of the invention as defined in the appended claims. For example, other suitable time delay devices, such as a delay type electromagnetic relay can be used in place of the thermostatic relay although I have found the thermostatic relay to be economical and reliable for this application. As another example, an optional "battery mode" latching type relay can be provided bypassing contacts 16 of relay 12 in FIG. 3 only when the alarm circuit is powered by the commercial AC power source whereby the alarm is turned off a limited period of time after activation only in the battery mode.

What is claimed is:

1. An alarm circuit responsive to unauthorized entry into an automobile, said automobile including a battery and horn means powered by said battery, and normally open switch means responsive to entry of said vehicle, said switch means being mounted to be responsive to an opening of an access member of the automobile, comprising:
a thermostatic relay including an electrical heating element and a set of normally open thermally responsive contacts, said contacts closing in a first period of time in response to heat generated by said heating element when said element is electrically energized, said contacts having sufficient thermal retention to remain closed for a second period of time greater than said first period of time after said element is de-energized;
a first electrical circuit including, in series, said battery, said switch means and said heating element, closing of said switch means causing a current flow from said battery through said heating element for heating said element;
a second circuit including, in series, said battery, said thermally responsive contacts and said horn means;
a key operated switch mounted to the exterior of said automobile and connected in series to said switch means in said second electrical circuit; and
dashboard mounted, auxiliary, manually activated push-button switch means bypassing said entry responsive switch means and said key operated switch for electrically energizing said heating element.

2. The alarm circuit of claim 1 wherein said auxiliary switch means includes a set of normally open contacts connected between said battery and said heating element.

3. The alarm circuit of claim 1 including a lamp connected to said battery in response to operation of said auxiliary switch means.

4. The alarm circuit of claim 2 wherein said auxiliary switch means further includes a set of normally closed contacts connected between said thermally responsive contacts and said alarm means for disabling said alarm means when said auxiliary switch means is operated.

5. An alarm circuit responsive to unauthorized entry into an automobile, said automobile including a battery and horn means powered by said battery, and normally open switch means responsive to entry of said vehicle, said switch means being mounted to be responsive to opening of an access member of the automobile, comprising:
a thermostatic relay including an electrical heating element and a set of normally open thermally responsive contacts, said contacts closing in a first period of time in response to heat generated by said heating element when said element is electrically energized, said contacts having sufficient thermal retention to remain closed for a second period of time greater than said first period of time after the element is de-energized;
a first electrical circuit including, in series, said battery, said switch means and said heating element, closing of said switch means causing a current flow from said battery through said heating element for heating said element;
a second electrical circuit including, in series, said battery, said thermally responsive contacts and said horn means;
key operated switch means mounted to the exterior of said automobile and serially connected to said second electrical circuit for selectively abling and disabling said alarm circuit;
a dashboard mounted, manually activated, normally open switch means bypassing both said entry responsive switch means and said key operated switch means for energizing said heating element regardless of the condition of said entry responsive and key operated switch means;
means associated with said bypassing switch means for disconnecting said horn means from said alarm circuit when said normally open bypassing means is closed; and
visual alarm means connected to said battery in response to closing of said bypassing switch means.

* * * * *